United States Patent [19]

Ebey

[11] Patent Number: 5,322,655
[45] Date of Patent: Jun. 21, 1994

[54] METHOD FOR MONITORING AND CONTROLLING THE WEIGHTS OF EACH LAYER OF A MULTILAYER TABLET

[75] Inventor: Glen C. Ebey, Marengo, Ill.

[73] Assignee: Thomas Engineering, Inc., Hoffman Estates, Ill.

[21] Appl. No.: 20,217

[22] Filed: Feb. 19, 1993

[51] Int. Cl.⁵ ............................................. B29C 43/20
[52] U.S. Cl. .................... 264/40.5; 264/109; 264/113; 264/255
[58] Field of Search .................. 264/113, 40.5, 40.1, 264/109, 255

[56] References Cited

U.S. PATENT DOCUMENTS

| | | | |
|---|---|---|---|
| 3,158,109 | 11/1964 | Stott | 425/345 |
| 3,255,716 | 6/1966 | Knoechel et al. | 264/40.5 |
| 4,238,431 | 12/1980 | Stüben et al. | 264/40.5 |
| 4,396,564 | 8/1983 | Stüben et al. | 264/40.5 |
| 4,507,229 | 2/1986 | Breen et al. | 264/40.1 |
| 4,817,006 | 3/1989 | Lewis | 264/40.5 X |
| 5,004,576 | 4/1991 | Hinzpeter et al. | 264/40.5 |
| 5,145,693 | 9/1992 | Hinzpeter et al. | 264/40.5 |
| 5,158,728 | 10/1992 | Sanderson et al. | 264/113 |
| 5,213,738 | 5/1993 | Hampton et al. | 264/113 |

*Primary Examiner*—Allan R. Kuhns
*Attorney, Agent, or Firm*—McAndrews, Held & Malloy, Ltd.

[57] ABSTRACT

A method for controlling and monitoring instrumentation for a multilayer tablet press mechanism is disclosed. The compression for each layer, other than the first, takes the measured variable or error from the previous layer control loop and applies a transformation to that variable or error. The resulting transformation is then used as a compensation to the subsequent layer control loop in the form of a modified set point, modified measure variable, modified error, or modified control output. Additionally, the variable or error resulting from the previous control loop is fed back into the controller for the previous control loop so that any adjustments necessary in the previous layer loop may be completed. The variable or error is also used to determine whether to accept or reject the tablet.

14 Claims, 9 Drawing Sheets

METHOD FOR MONITORING AND CONTROLLING THE WEIGHTS OF EACH LAYER OF A MULTILAYER TABLET

BACKGROUND OF THE INVENTION

This invention relates to a method of manufacturing tablets consisting of two or more separate layers of material, and more particularly relates to a method of independently monitoring the amount (weight) of powder comprising each layer and making controlled adjustments to the filling mechanisms which determine those weights in order to maintain each layer within proper weight limits.

Monitoring and controlling the weights of single layer tablets produced on rotary presses is a well established art. Typically, tablet weights are determined by measuring the amount of force necessary to compress or compact a powder or granulation into a solid tablet. For a given product, the compaction force necessary to obtain the desired tablet thickness and hardness when the press is making tablets having the correct weight is known. Overweight tablets resulting from excessive material in the die cavities will cause higher than normal compression forces. Low weight tablets resulting from insufficient powder being present will cause below normal forces. Currently, a whole array of electronic and mechanical hardware and computer software is available from various vendors for monitoring tablet compression and making adjustments to press powder fill mechanisms as required to keep tablet weights within specified limits. For example, over and underweight tablets are typically detected in tablet presses through use of a strain gauge transducer (or related mechanism) for measuring the forces in the opposing punches. Such a strain gauge transducer is disclosed in U.S. Pat. No. 3,791,205 issued on Feb. 12, 1974. U.S. Pat. No. 3,734,663, issued May 22, 1973, discloses a control circuitry that monitors, and if necessary, changes the amount of powder placed in the die in response to measured tablet compressive forces, as detected by changes in resistance in a strain gauge.

Rotary tablet presses having two complete sets of the cams, feeders, pressure rolls, etc. necessary to form and discharge tablets are referred to as double sided machines. Since two tablets per station of tooling in the turret are produced for each revolution of the turret, these machines have twice the output of a single sided machine operating at the same turret speed. As such, double sided presses are normally used for products manufactured in large volumes. These machines, however, are also used to make tablets having two separate layers of material.

In two layer tablet production, the die cavities in the turret are filled to the desired level with the first layer material as they pass underneath the feeder on one side of the machine. This first layer material is then compressed, usually at a greatly reduced force level than what is normally used in single layer tablet making. After compression, the dies pass under the feeder on the other side of the machine and are filled to the appropriate level with second layer material. The dies, with both first and second material in them, then move to the final compression rolls where solid tablets are formed. Tablet ejection from the die cavities and scrape off follow.

Monitoring and controlling the weight of first layer material in a two layer operation is almost identical to single layer production. In general, the only difference is that a much lower compression force is used to tamp the material prior to introducing the second layer material. This first layer tamp is intended to make room in the die cavity for second layer material and provide a sharp demarcation line between layers.

Second layer weight monitoring and control is much more problematic since the compression signal generated during final tablet compression is affected by both first and second layer weight variations. Lower than target force signals may be the result of low first and/or low second layer weights. They could even result from very low first layer weights and high second layer weights or vice versa. Compounding this situation is the fact that the compression properties of each layer may be very different.

Currently two approaches are used to control tablet weights for a two layer process. The first is to monitor and control only the first layer side. Second layer (final) compression forces may or may not be monitored for the purpose of rejecting bad tablets but no automatic adjustments are made to the second layer fill mechanism. The second approach involves actual control of both first and second layer material. First layer weights are monitored and controlled the same way as for single layer production. Second layer control is achieved in much the same way except that the second layer control loop must be desensitized to the measured compression force errors (deviations from set point) arising from first layer weight variations. This is accomplished by decreasing the second layer control loop gain.

Although the second control scheme described above can result in improved second layer weight control, its success is highly dependent upon the degree to which the first layer is being controlled. Even for well behaved first layer materials, weight control of the second layer is less than optimum because the control loop gain must be reduced so as not to overact to the variation, or noise, from the first layer.

Accordingly, it is an object of this invention to provide a tablet press control mechanism suitable for the manufacture of a multilayer tablet whereby tablet compression information for each layer is precisely monitored and a method therefore.

It is a further object of this invention to provide a method for the manufacture of a multilayer tablet that permits the monitoring and controlling of the compression information for each individual layer independently.

It is a further object of this invention to provide a method for the manufacture of a multilayer tablet that permits a quality determination (i.e., a rejection decision) of the tablet based on the compression information for each layer of the tablet independently. That is, a rejection decision may be made based on the compression information for any layer independent from the compression information for the remaining layers.

It is an additional object of this invention to provide a method for the manufacture of a two-layer tablet utilizing a double-sided rotary multilayer tablet press that precisely monitors tablet compression information for each layer independently.

SUMMARY OF THE INVENTION

These and other objects of the invention are achieved by providing a method for controlling and monitoring instrumentation for a multilayer tablet press mechanism. The control or monitoring system for each layer, other than the first, takes the measured variable or error from previous layer control loops and applies a transformation to those variables or errors. The resulting transformation is then used as a compensation to the subsequent layer control loop in the form of a modified set point, modified measured variable, modified error, or modified control output. The compensation which is applied to the subsequent layer control loop removes the effect of previous layer weight variations on a punch-by-punch basis for control and reject purposes. Additionally, the variable or error resulting from the previous control loop is fed back into the controller for the previous control loop so that any adjustments necessary in the previous layer loop may be completed. The variable or error for each control loop may also be used as a basis for determining whether to accept or reject a tablet.

DETAILED DESCRIPTION OF THE INVENTION

Figure 1:
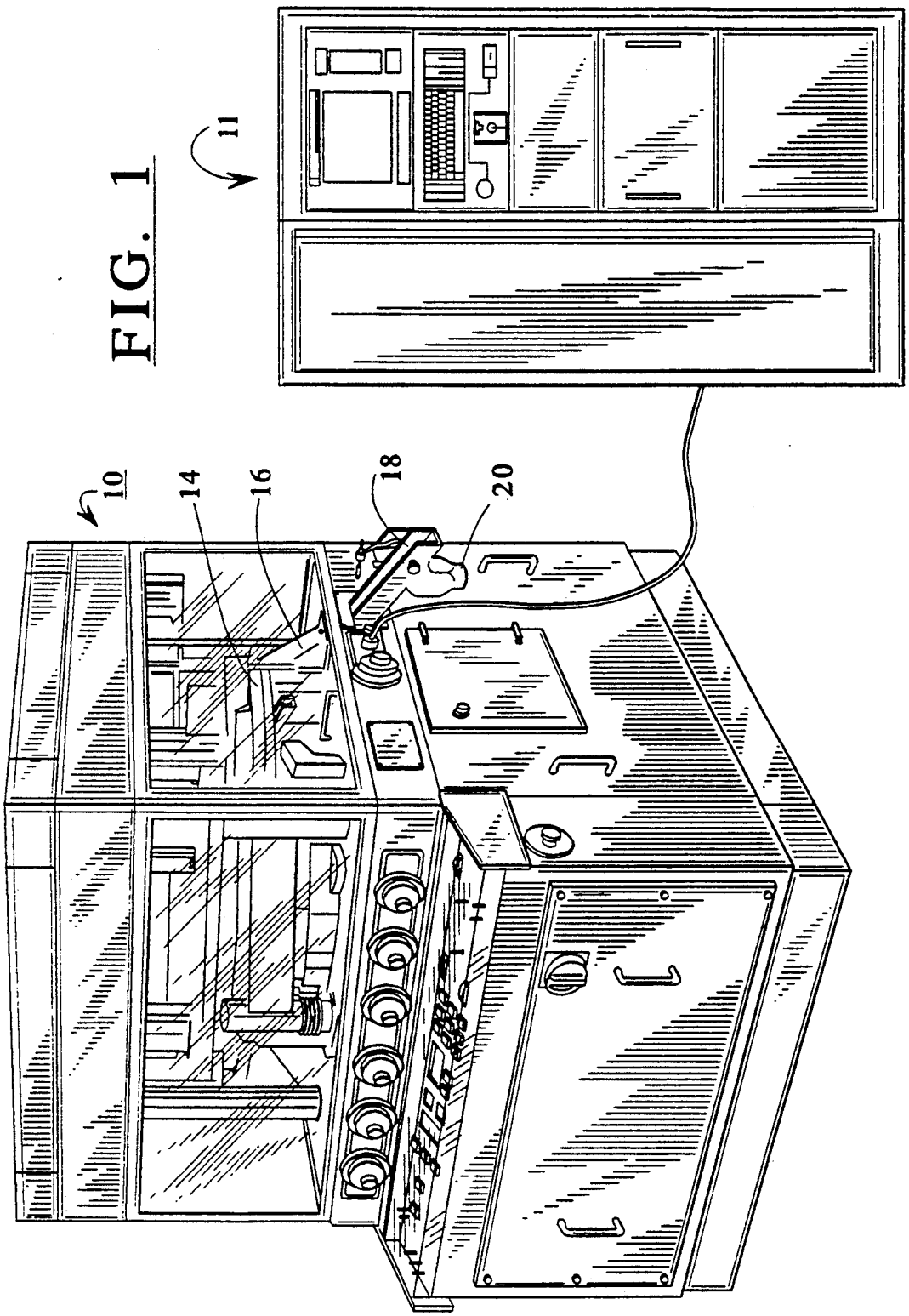
FIG. 1 is a pictorial perspective illustration of a pharmaceutical tablet press mechanism connected to a tablet press controller.

Referring now to FIG. 1, a tablet press mechanism 10 and its tablet press controller 11 are illustrated.

Tablet press mechanism 10 includes a rotary turret 14 holding a plurality of dies (not shown in FIG. 1) for the formation of tablets from powders compressed between punches (also not shown in FIG. 1). The rotary turret 14 rotates at a high angular velocity between an upper and lower cam mechanism for operation of the tablet forming punches. Once formed, tablets are moved from the vicinity of rotary turret 14 to an inner discharge chute 16 and to an outer discharge chute 18. Defective tablets are ejected from a reject exit 20.

Control tower 11 houses the computer hardware and software for controlling the tablet press mechanism 10. The functioning of the control tower 11 is discussed hereinafter.

Figure 2:
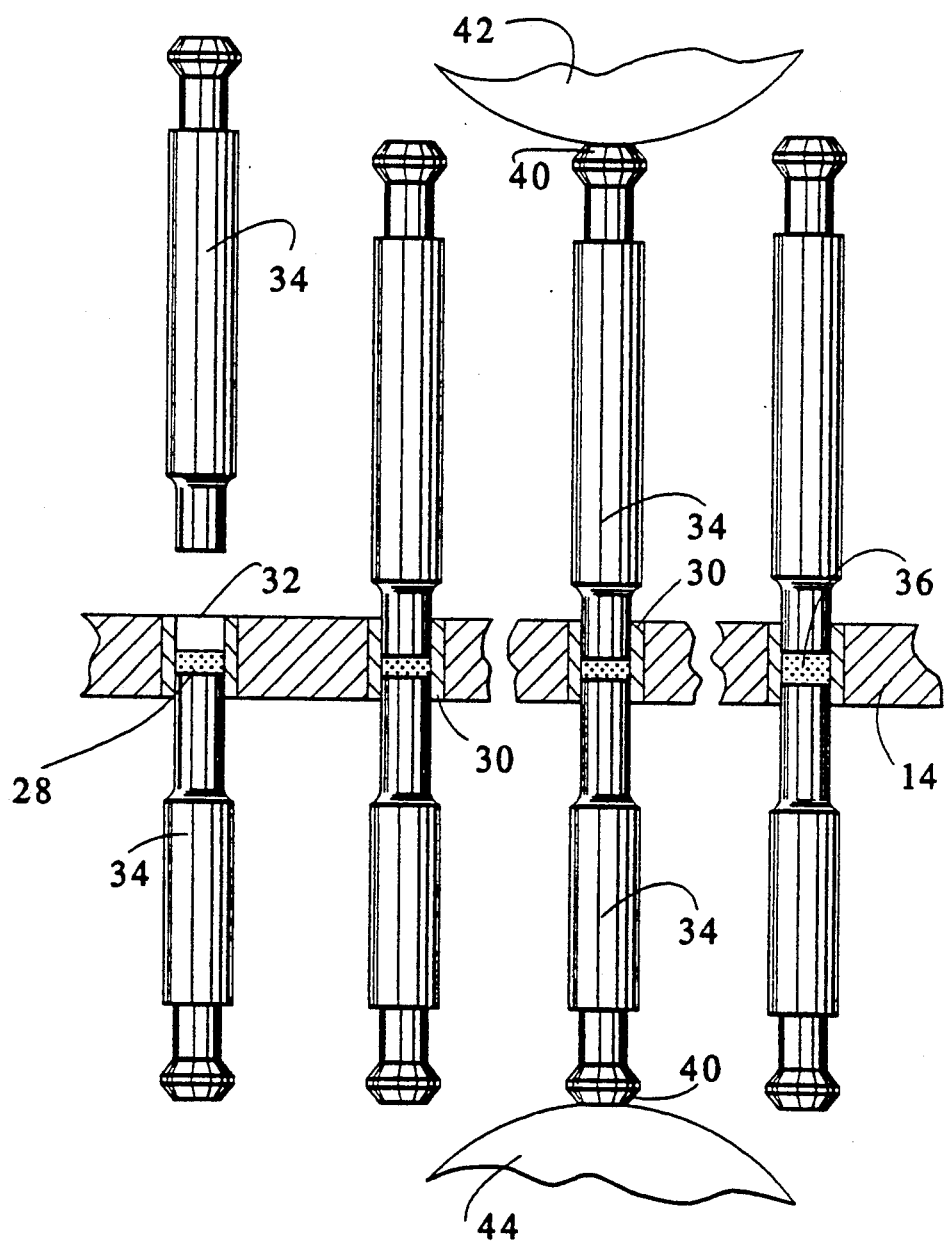
FIG. 2 is a first side cross-section view of a portion of the tablet press mechanism illustrated in FIG. 1 showing the tablet press dies.

Referring now to FIG. 2, a portion of a first tablet punch and die mechanism is illustrated. The first tablet punch and die mechanism is located at a first station on the press mechanism. A plurality of dies 30 are mounted within rotary press turret 14. Each die 30 defines a cavity 32 into which punches 34 may slide vertically for forming a first layer of a two-layer tablet. First powder 36 is inserted into cavity 32 and compressed between the punches to form a first layer 28. The compressive action of punches 34 results from contact of the punch heads 40 with a first upper roll 42 and a first lower roll 44. Each punch 34 is operated by first rolls 42 and 44 and by rotation of rotary turret 14, since the rolls are fixed and the punches 34 rotate with the turret 14.

At this point, the first layer 28 has been compressed and remains in the cavity 32 supported by a punch 34. The rotational movement of the turret 14 advances the first layer 28 toward a second station.

Figure 3:
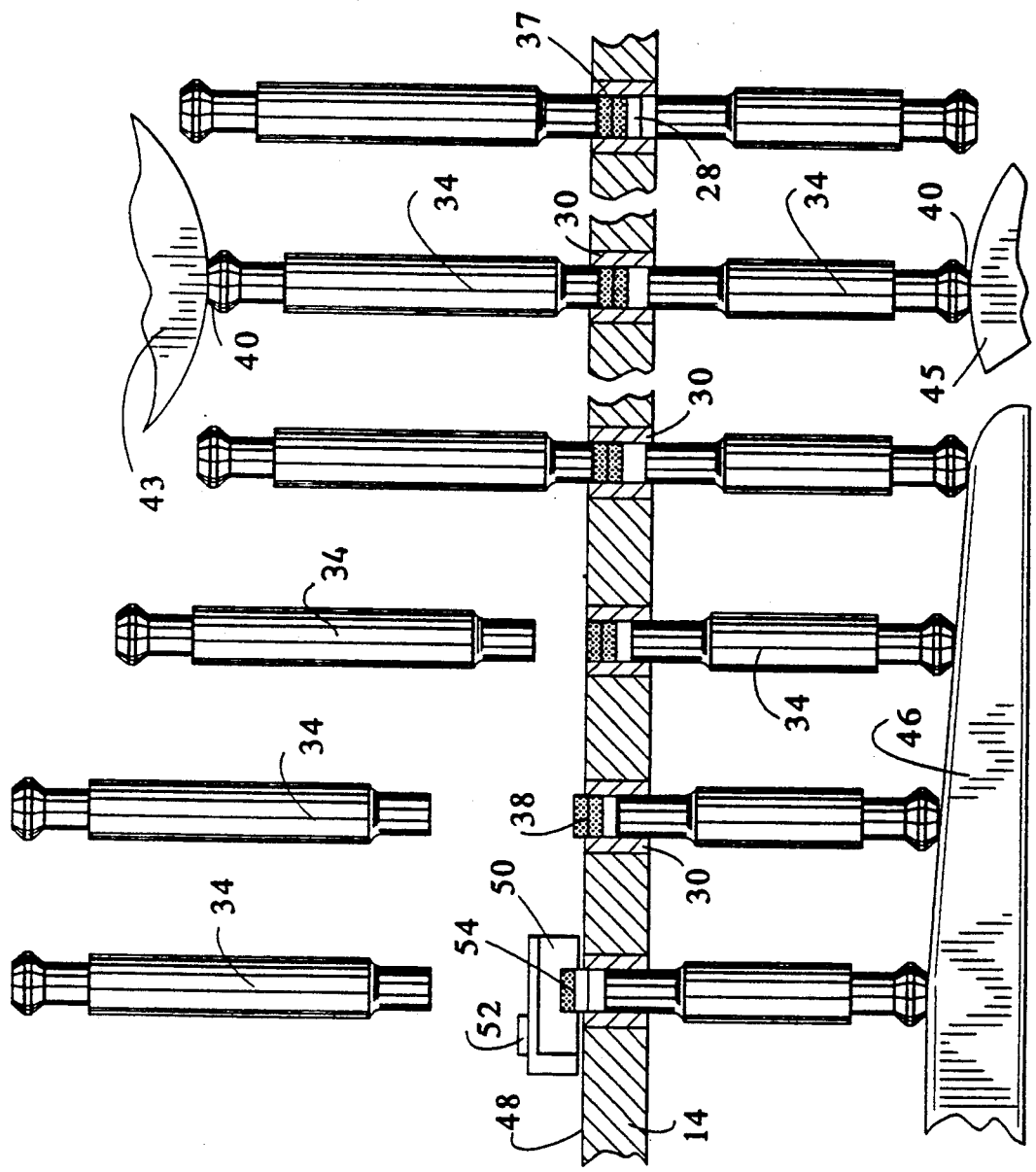
FIG. 3 is a second side cross-sectional view of a portion of the tablet press mechanism illustrated in FIG. 1 showing the tablet press dies.

Referring now to FIG. 3, a portion of a second tablet punch and die mechanism is illustrated. The second tablet punch and die mechanism is located at a second station on the press mechanism. At the second station, a second powder 37 is inserted into cavity 32 on top of first layer 28. The second powder 37 is compressed in much the same way as the first powder 36 is compressed.

Punches 34 may slide vertically for compression of the first layer 28 and the second powder 37 and two-layer tablet formation. The compressive action of punches 34 result from contact of the punch heads 40 with a second upper roll 43 and a second lower roll 45. Punches 34 are operated by second rolls 43 and 45 and by rotation of rotary turret 14.

Removal of the formed two-layer tablet 38 from the cavity 32 is effected by operation of a lifting roll 46 contacting only the lower punches such that as the turret 14 rotates, tablet 38 is lifted to the top surface 48 of the rotary turret 14.

Tablets 38 are then moved from the top surface 48 of the rotary turret 14 by a guide wall 50. Defective tablets are ejected from the vicinity of guide wall 50 by a pneumatic jet of air from a nozzle 54 of pneumatic tube 52.

Figure 4:
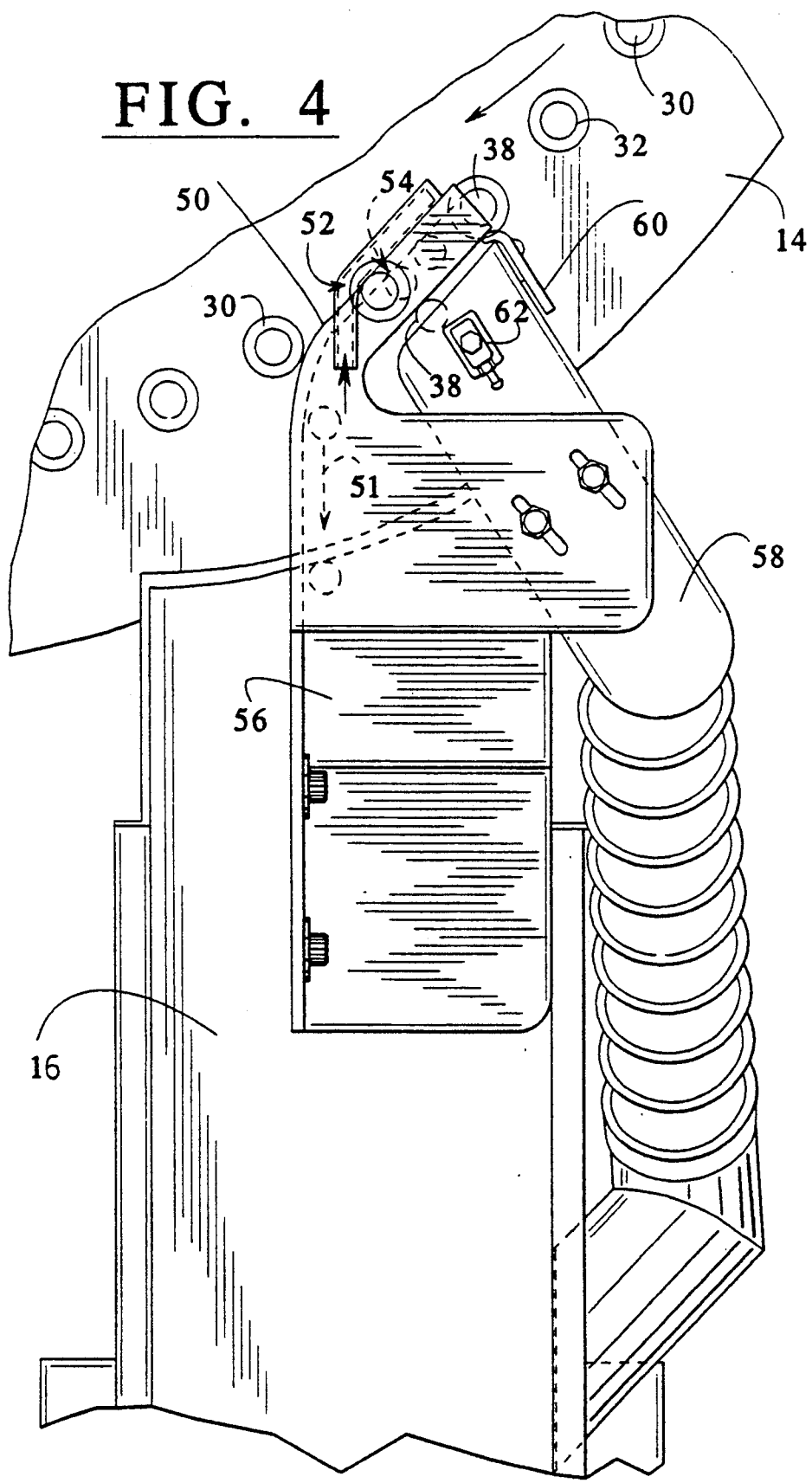
FIG. 4 is a top plan view of a portion of the tablet press mechanism illustrated in FIGS. 1, 2, and 3 showing separation of the formed tablets from the dies and the mechanism for rejection of defective tablets.

Referring now to FIG. 4, tablets 38 rotate clockwise with rotating turret 14. As tablets 38 rise from cavity 32, they contact guide wall 50 which guides the tablets from the vicinity of dies 30 along an ejection path 51. The tablets 38 are deflected downwardly by a downward slanting wall 56 to inner discharge chute 16 and out outer discharge chute 18 (FIG. 1). Rejected tablets are moved by a pneumatic jet of air from nozzle 54 into a reject area 58 and out reject exit 20 (FIG. 1). In the preferred embodiment, the reject gate includes a constant low pressure air flow of approximately 5 P.S.I. from a low pressure tube 60. The constant air flow improves rejection of unusually shaped tablets. Also in the preferred embodiment, the reject gate includes a constant air flow from an upper nozzle 62 to create a vacuum in the reject area 58. Details of the operation of such reject gates are well known in the art.

The tablet press as described above is generally configured as a double-sided rotary tablet press, that simultaneously compresses and forms a first layer of a two-layer tablet at a first station on one side of the rotary and a second layer of a two-layer tablet at a second station on the opposite side of the rotary turret.

Referring back to FIG. 2, compression information for the first station is derived from forces detected by strain gauge transducers. Such strain gauge transducers may be located in rolls 42 and 44. Alternatively, or in addition to the strain gauge transducers located in rolls 42 and 44, strain gauge transducers may monitor the compression force between a pair of precompression rolls similar to and positioned upstream of rolls 42, 44. Precompression occurs prior to the final compression in order to slightly compact the powder to remove air from within the die cavity prior to compression.

Referring to FIG. 3, as with the first station, compression information for the second station is derived from forces detected by strain gauge transducers. Strain gauges of the second station may be located to monitor the compression force between rolls 43 and 45 to indicate the compression force which occurs at the time of second layer compression, i.e., final compression. Alternatively, or in addition to the strain gauge transducers located in rolls 43, 45, strain gauge transducers may monitor the compression force between a pair of precompression rollers similar to and positioned upstream of rolls 43, 45.

The compression information obtained from measuring the forces exerted on the powder by punches 34 is used where the punches compress the powder to an established thickness and a target force that corresponds to the target weight of powder being compressed to that thickness has been established.

The compression information of either station may alternatively correspond to displacement of the compression mechanism—i.e., for first station, rolls 42 and 44, and for second station, rolls 43, and 45—when a target displacement for a target weight of the corresponding powder is established at a set compression force. Other compression information may also be utilized in the method of this invention.

Figure 5:
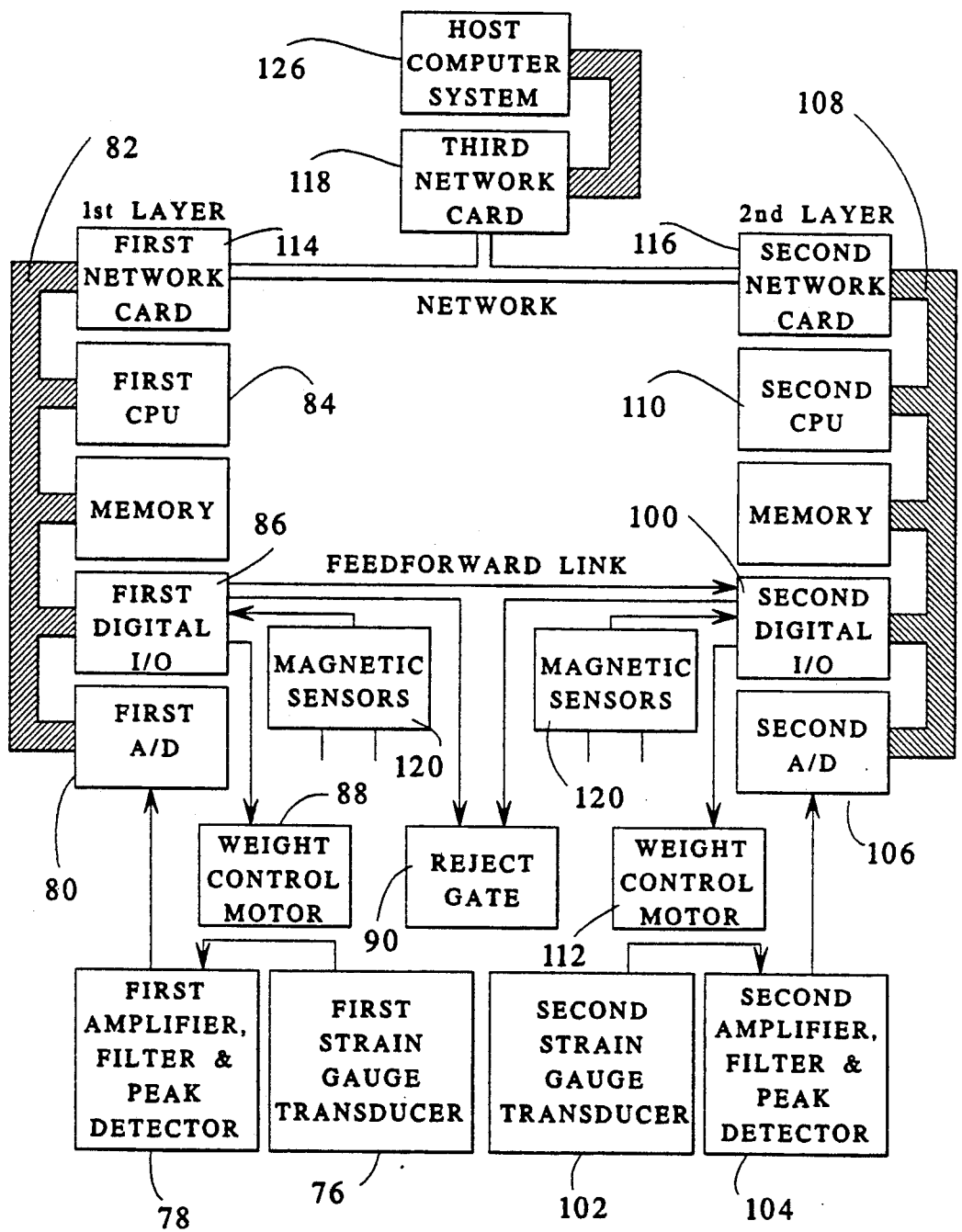
FIG. 5 is a block diagram of the control system of the tablet press control mechanism and controller of FIG. 1.

FIG. 5 is a block diagram of the control system of the tablet press control mechanism 10 and controller 11 of FIG. 1. The first strain gauge transducer 76 corresponds to the strain gauge transducer of the first station. The first strain gauge transducer 76 generates a control signal which is received by a corresponding first peak detector 78 that determines the peak of the control signal which represents the maximum strain on punches 34 at the associated compression and/or precompression stage. If strain gauge transducers are located at both the compression stage (i.e., at rolls 42 and 44 of FIG. 2) and the precompression stage, a plurality of peak detectors may be utilized in the event that a strain reading at the compression stage occurs simultaneously with a strain reading at the precompression stage. The separate peak detectors should hold the strain peak voltage reading until the control system is able to read it.

The analog signal from each peak detector is converted to a digital signal by a first analog-to-digital converter 80. The first A/D converter 80 puts the digital signals corresponding to the control signals generated by first strain gauge transducer 76 on first bus 82.

First CPU 84 reads the information off of the first bus 82 in a manner well known in the art. The preferred bus architecture is STD Bus. Other bus configurations may be utilized depending on the clock speed requirements of the control system.

First CPU 84 then performs the necessary transformations to the information for use by the remaining cards attached to first bus 82.

Specifically, first CPU 84 through the necessary transformation, creates a signal for use by the first digital input/output card 86. First digital I/O card 86 in turn sends the transformed information to the first weight control motor 88, the reject gate 90, and the second digital I/O card 100 in order to control the amount of first powder 36 to be deposited in cavity 32 (FIG. 2), determine whether to reject a tablet 38 at the reject gate 90 based on the compression information from the first station, and modify the compression information from the second station for controlling the amount of second powder 37 to be deposited in cavity 32, (FIG. 3) respectively.

Second strain gauge transducer 102 corresponds to the strain gauge transducer of the second station. The second strain gauge transducer 102 generates a control signal which is received by a corresponding second peak detector 104 that determines the peak of the control signal which represents the maximum strain on punches 34 at the associated compression and,;or precompression stage. As with the first station, a plurality of peak detectors may be utilized. The analog signal from each peak detector is converted to a digital signal by a second analog-to-digital converter 106. The second A/D converter 106 puts the digital signals corresponding to the control signals generated by second strain gauge transducer 102 on second bus 108.

Second CPU 110 reads the information off of the second bus 108 and performs the necessary transformations to the information for use by the remaining cards attached to second bus 108.

Specifically, the second digital I/O card 100 sends the transformed information to the second weight control motor 112 and the reject gate 90 in order to control the amount of second powder 37 to be deposited in cavity 32 (FIG. 3) and determine whether to reject a tablet 38 at the reject gate 90 based on the compression information from the second station.

The embodiment described above relates to the manufacture of a two-layer tablet. However, should the need arise for a third layer or more layers, the second digital I/O card 100 could forward the combined first and second station transformed information to a third and subsequent digital I/O cards corresponding to a third and subsequent compression stations.

Information is also provided to first and second digital I/O cards 86, 100 by a plurality of magnetic sensors, generally indicated by diagram block 120. The magnetic sensors monitor the movement of the turret 14 relative to the associated compression stations and the proximity of any tablets 38 marked for rejection to the reject gate 90.

First network card 114 and second network card 116 also access first bus 82 and second bus 108, respectively, to relay information between each other and to a third network card 118. The third network card is in communication with the host computer system 126 such as may be housed in controller 11 (FIG. 1).

Figure 6:
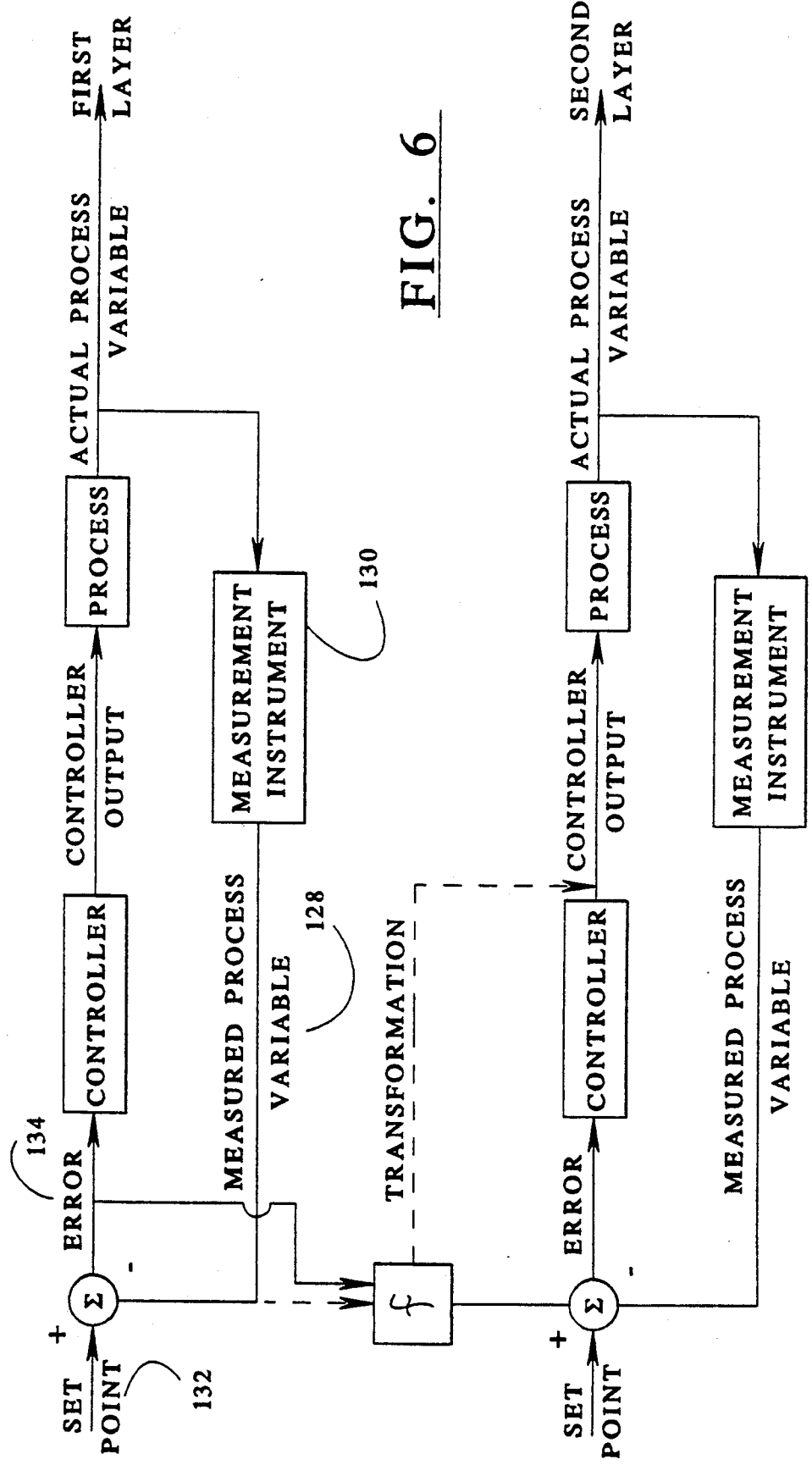
FIG. 6 is a control schematic for the weight control of the layers in a two-layer tablet.

FIG. 6 is a control schematic for the weight control of the layers in a two-layer tablet.

The method of the present invention takes the measured error 134 measured by the measurement instrument 130, applies a transformation to that value, and then uses the result as a compensation to control the second compression station in the form of a modified setpoint, modified measured variable, modified error, or modified control output. FIG. 6 illustrates both the preferred control flow and alternative control flows. Those skilled in the art will readily recognize that numerous other alternative control flows are possible. Each control flow, preferred or alternative, reflects the error detected as a result of overfill or underfill at the cavity. Accordingly, the present invention contemplates the use of values identified in FIG. 6—i.e., error, controller output, actual process variable, and measured process variable.

As each die 30 (FIG. 2) loaded with first layer powder 36, undergoes the first stage of compression, the resultant force level is measured by the measurement instrument 130. This force level is compared to a target or set point value 132 and a signed error 134 relative to the target value 132 is calculated.

The measured process variable 128 is used in a feedback loop for first layer weight control and to determine whether the tablet 38 should be accepted or rejected. This measured error 134 is multiplied by an appropriate gain factor so that it is now representative of the error it will introduce at final compression in the second punch and die mechanism. The modified error value for each die 30 is individually saved in a series of sequential storage registers.

After the dies 30 (FIG. 3) have taken on second layer powder 37, final compression occurs. As each die 30 reaches the point of final compression, the modified value for that die, calculated from first layer compression and saved in a storage register, is added to the target force setpoint at final compression to arrive at an adjusted setpoint value.

The measured force for each die 30 (FIG. 3) at final compression is compared to its adjusted setpoint value and a signed error value is calculated. Since the target force for each die 30 has been adjusted to negate the effect of any first layer weight variation, the measured error at final compression can be attributed to second layer weight variation. This error can now be used in a feedback loop for adjusting the second layer weight control and to determine whether the tablet 38 should be accepted or rejected.

Figure 7:
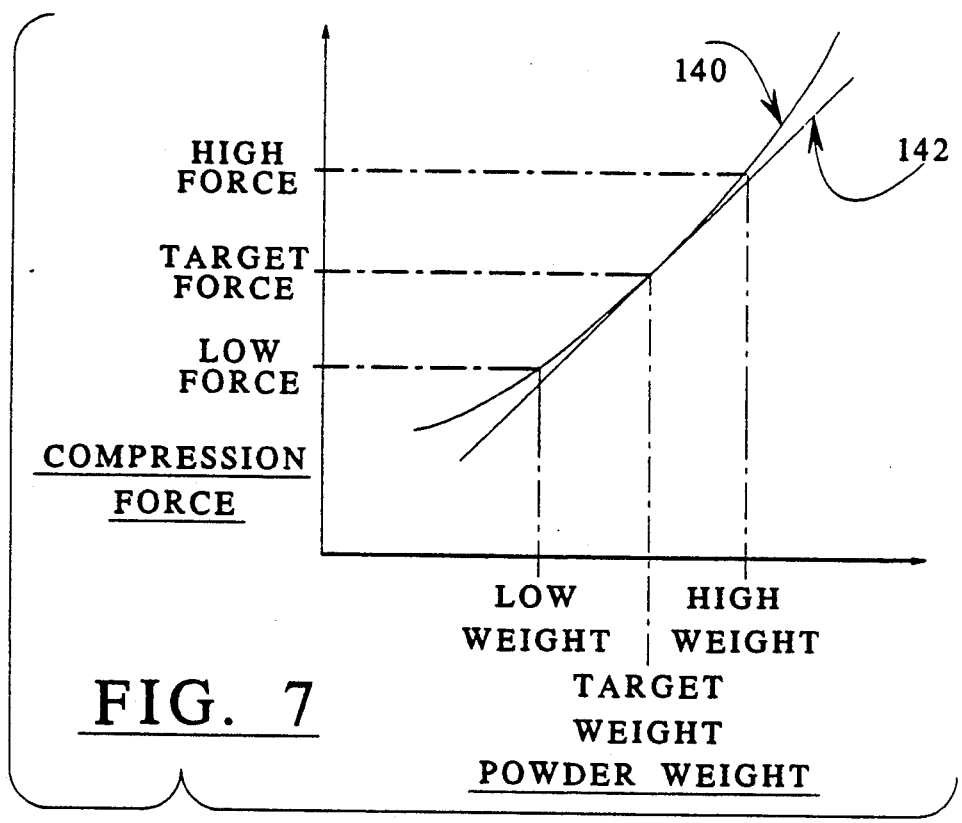
FIG. 7 shows a representative characteristic curve for compression force versus powder weight when a material is compressed to a fixed thickness.

FIG. 7 shows a representative characteristic curve 140 for compression force versus powder weight when a material is compressed to a fixed thickness. The compaction force necessary to compress a loose powder into a solid tablet having a given thickness varies as a function of the amount (weight) of powder present in the die cavity. Mathematically, characteristic curves are exponential in nature having the form:

$$Log(F) = Log(a_0) + (a_1) Log(w)$$

Where:
F = Compression Force
W = Powder Weight
$a_0$ = Powder Coefficient
$a_1$ = Powder The exact values of $a_0$ and $a_1$ are dependent upon the particular physical characteristics of the powder being compressed. For the purpose of electrical compression force monitoring and control of the die fill mechanism, the characteristic curve 140 can be approximated by a straight line 142 about the target weight as shown in FIG. 7. The slope of this line has units of force per unit weight (i.e., newtons per milligram). Since force is the measured variable and weight is the actual control variable, the slope of the characteristic line 142 provides the means of converting a measured error into an appropriate control response. This linear approximation is very close to the actual characteristic curve over the range of weight variations normally observed to occur using tablet press mechanisms and therefore allows precise weight monitoring and control.

Figure 8:
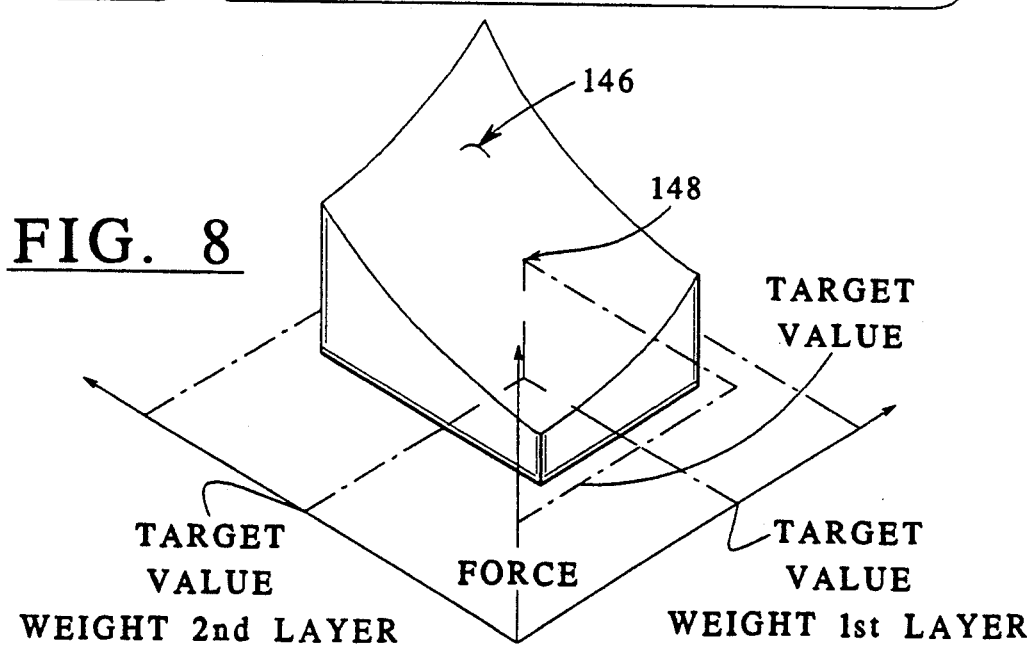
FIG. 8 is a three dimensional characteristic surface that describes the force-weight relationship for compression of two layers of powder.

FIG. 8 is a three dimensional characteristic surface 146 that describes the force-weight relationship for compression of two layers of powder. When two layers of powder are compressed to a fixed total thickness using a tablet press mechanism, the force necessary to form the tablet varies, not only as a result of variations in the first layer weight, but also due to variations in the second layer powder weight. Any compression event resulting from the compression of a given amount of first and second layer materials can be represented by a point somewhere on the characteristic surface 146. As an example, FIG. 8 shows the target point 148 for the case where both layers are at target weight values.

Figure 9:
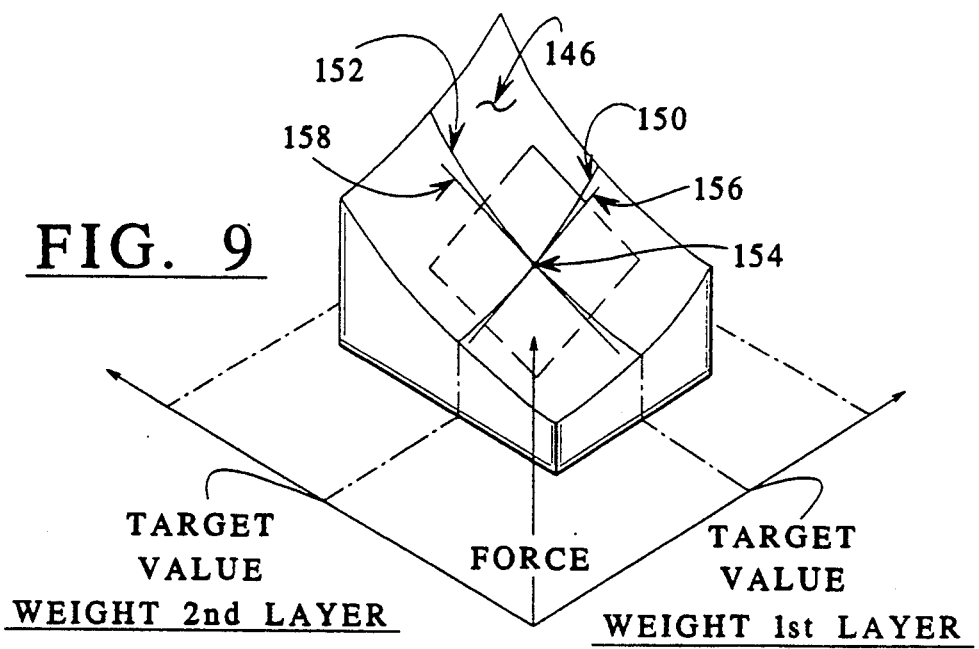
FIG. 9 illustrates two special case curves on the characteristic surface which are of interest in the development of an independent two layer control scheme.

FIG. 9 illustrates two special case curves on the characteristic surface which are of interest in the development of an independent two layer control scheme. First curve 150 shows the force-weight relationship for the first layer material if the second layer material is at its target value. This curve is similar to one shown in FIG. 7. Second curve 152 shows the force-weight relationship for the second layer material if the first layer material is at its target value. The intersection of first curves 150 and second curve 152 is the desired point of operation since both layers are at target weight values at that two-layer target point 154.

Curves 150 and 152 can be approximated by straight lines tangent to the characteristic surface at the target point 154. The slope of first line 156 has units of force per unit weight of layer 1 and, likewise, second line 158 has units of force per unit weight of layer 2. These two lines define a plane, which in the preferred embodiment, is used as an approximation of the characteristic surface 146 for control purposes.

EXAMPLE 1

Figure 10:
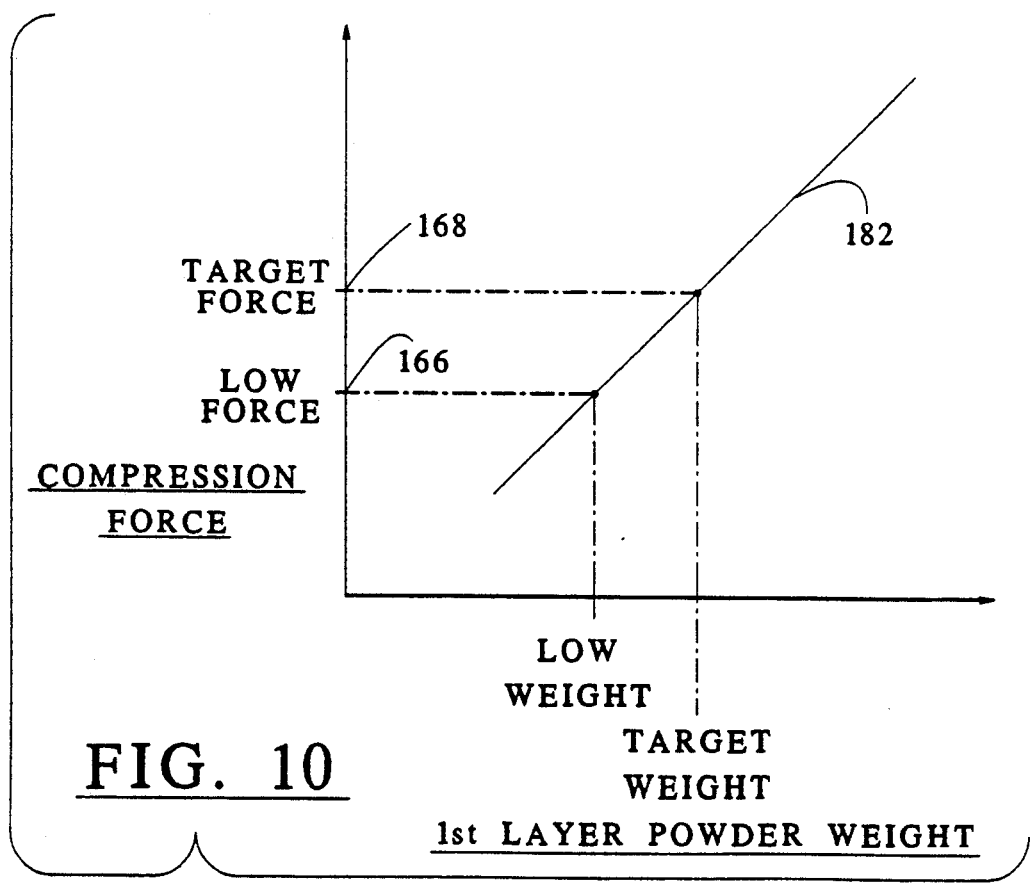
FIG. 10 illustrates the resulting compression force when a die cavity is filled with an amount of first powder below the desired amount.

FIG. 10 illustrates the resulting compression force when a die cavity is filled with an amount of first powder below the desired amount. The compression force value 166 recorded for this compaction event will be below the target point force value 168. Subtracting the target force value from the measured force gives a signed (+ or −) force error for that event which is proportional to the error in powder weight. Dividing the signed force error by the slope of the linear approximation to the characteristic curve, yields a signed number indicative of the weight error. This number is then used for the purpose of feedback control of the first layer weight control mechanism. It is also stored away in a memory register identifiable with that given die cavity. The weight error is stored in the memory register for the purpose of determining whether the resulting tablet should be rejected or accepted when the corresponding die cavity approaches the final tablet compression stage as discussed above in connection with FIG. 3 and for modifying the compression force at the second compression station.

Figure 11:
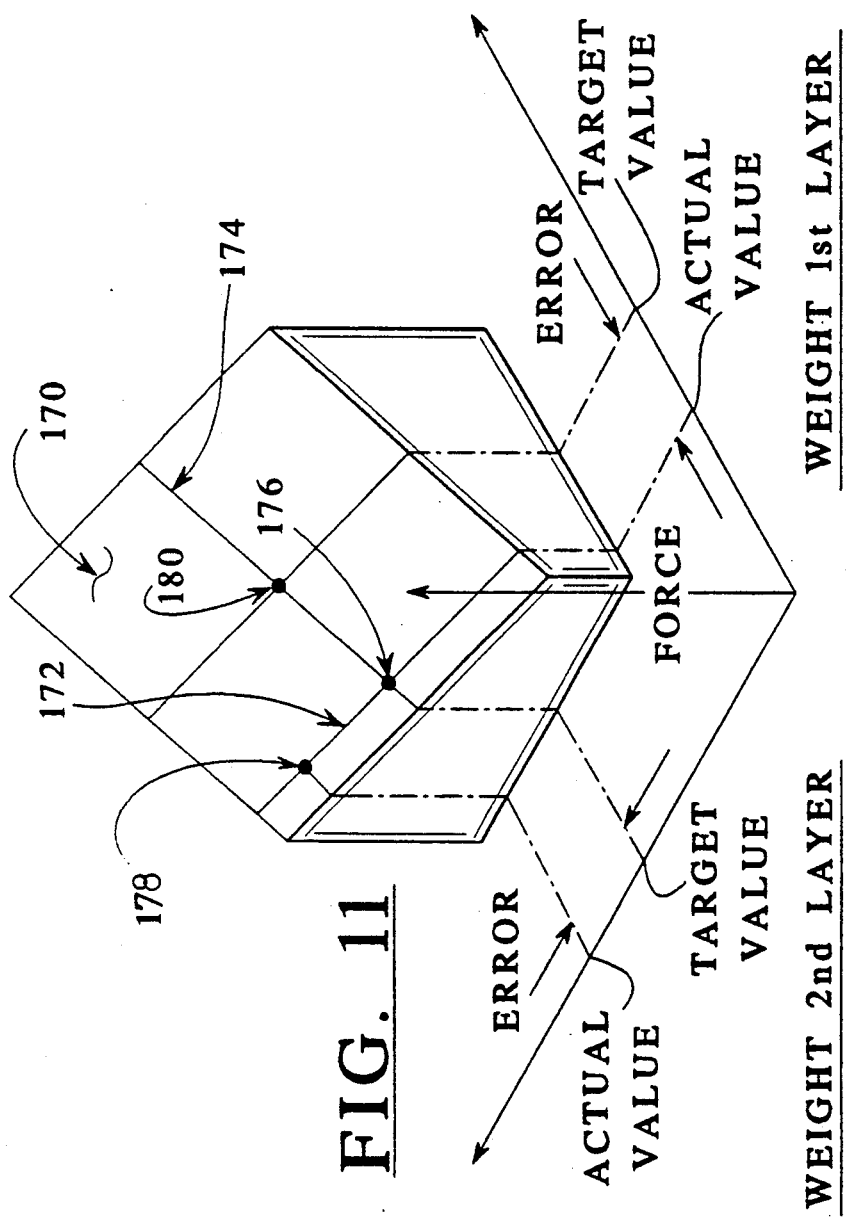
FIG. 11 illustrates the resulting compression force when a die cavity is filled with an amount of first powder below the desired amount and an amount of second powder above the desired amount.

FIG. 11 illustrates the resulting compression force when a die cavity is filled with an amount of first powder below the desired amount and an amount of second powder above the desired amount.

After second layer material has been deposited on top of the first layer material in the given die cavity, another compression event—now involving both materials—occurs. The force measured for this compression event lies somewhere on the planar surface 170 approximating the characteristic surface. Since the first layer weight error has previously been calculated and stored in a register identifiable with that given die cavity, a first line 172 on the planar surface 170 can be drawn such that all points on first line 172 correspond to the retrieved first layer weight. The intersection of first line 172 with second line 174, defines the compressional force value expected if the second layer material weight is at its target value. The force level corresponding to this intersection point can be calculated by multiplying the retrieved first layer weight error by the slope of second line 174 and adding the signed result (+ or −) to the target value 180. This calculated value is the adjusted target value 176 for the compression event involving both materials.

In this example, the weight of second layer material in the given die cavity for the compression event just recorded is above target weight. The resultant compression force for this event will be higher than the adjusted target value 176. Subtracting the adjusted target value 176 from the measured value 178 yields a signed force error for that event which is proportional to the error in second layer powder weight. This number can now be used to make appropriate adjustments to the second layer fill mechanism and determine whether the resulting tablet should be accepted or rejected based on second layer weight error.

An alternate, and preferred, method of determining the error in second layer powder weight is to add to the measured value 178 a signed error. The signed error is a multiple of the difference between the target value 180 and adjusted target value 176. In this way the measured value 178 may be adjusted to be compared to the original target value 180 and thus determine the error in second layer powder weight. Specifically, the signed error is derived by multiplying the difference between the target value 168 and measured value 166 (FIG. 10) by the ratio of the slopes of line 174 (FIG. 11) and 182 (FIG. 10).

It should be noted that in the preferred embodiment of the independent two layer control system of this invention, powder weight and weight error are not measured directly. Compression force and the position of the die fill adjustment mechanism which are proportional to powder weight are monitored and controlled. Thus, the linear and planar approximations to the characteristic curve and surface discussed in the above development are actually based on force-filled mechanism position rather than force-weight. Furthermore, since exact equations can be obtained for both the characteristic curve and surface, using linear and planar approximations is not a necessary requirement but rather is a means of simplifying computations.

Those skilled in the art will readily recognize that the above example can be expanded to include the controlling and monitoring of third and/or subsequent layers by creating similar models that utilize weight information for more than one layer on one of the weight axes as illustrated in FIG. 11.

What is claimed is:

1. A method for monitoring and controlling the weights of individual layers in multilayer tablets being formed using a plurality of dies and fill regulators from a first powder and a second powder, in relation to first and second set points and registers, comprising:

filling into a first die a first powder;
   compressing the first powder within the first die and measuring a first value of a compression information associated with the compression of the first powder;
   saving the first value in a first register;
   filling the first die with a second powder located above and on the compressed first powder;
   compressing the second powder within the first die and measuring a second value of a compression information associated with the compression of the second powder;
   saving the second value in a second register;
   recalling the first value from the first register and comparing the first value to a first set point to determine a first error;
   utilizing the first error to regulate a first fill regulator to deposit the first powder into a second die such that compression of the first powder in the second die results in the first value more closely approaching the first set point;
   utilizing the first error in establishing a second set point to which the second value will be compared;
   recalling the second value from the second register and comparing the second value to the second set point to determine a second error; and
   utilizing the second error to regulate a second fill regulator to deposit the second powder in the second die such that compression of the second powder in the second die results in the second value more closely approaching the second set point.

2. The method of claim 1 further comprising the step of recalling the first error and comparing the first error to an acceptable error range to determine whether to accept or reject a tablet.

3. The method of claim 1 further comprising the step of recalling the second error and comparing the second error to an acceptable error range to determine whether to accept or reject a tablet.

4. The method of claim 1 wherein the first value of compression information corresponds to a resultant force measured while compressing the first powder to an established thickness and the first set point corresponds to a target force corresponding to a target weight of first powder.

5. The method of claim 1 wherein the second value of compression information corresponds to a resultant force measured while compressing the second powder to an established thickness and the second set point corresponds to a target force corresponding to a target weight of second powder.

6. The method of claim 1 wherein the first powder is compressed with a compression mechanism, the first value of compression information corresponds to a displacement of the compression mechanism measured while compressing the first powder at an established force, and the first set point corresponds to a target displacement of the compression mechanism corresponding to a target weight of first powder.

7. The method of claim 1 wherein the second powder is compressed with a compression mechanism, the second value of compression information corresponds to a displacement of the compression mechanism measured while compressing the second powder at an established force, and the second set point corresponds to a target displacement of the compression mechanism corresponding to a target weight of second powder.

8. A method for monitoring and controlling the weights of individual layers in multilayer tablets being formed using a plurality of dies and fill regulators from a first powder and a second powder, in relation to first and second set points and registers, comprising:

filling into a first die a first powder;

compressing the first powder within the first die and measuring a first value of a compression information associated with the compression of the first powder;

saving the first value in a first register;

filling the first die with a second powder located above and on the compressed first powder;

compressing the second powder within the first die and measuring a second value of a compression information associated with the compression of the second powder;

saving the second value in a second register;

recalling the first value from the first register and comparing the first value to a first set point to determine a first error;

utilizing the first error to regulate a first fill regulator to deposit the first powder into a second die such that compression of the first powder in the second die results in the first value more closely approaching the first set point;

recalling the second value form the second register;

utilizing the first error in adjusting the second value;

comparing the adjusted second value to the first set point to determine a second error; and utilizing the second error to regulate a second fill regulator to deposit the second powder in the second die such that compression of the second powder in the second die results in the second value more closely approaching the second set point.

9. The method of claim 8 further comprising the step of recalling the first error and comparing the first error to an acceptable error range to determine whether to accept or reject a tablet.

10. The method of claim 8 further comprising the step of recalling the second error and comparing the second error to an acceptable error range to determine whether to accept or reject a tablet.

11. The method of claim 8 wherein the first value of compression information corresponds to a resultant force measured while compressing the first powder to an established thickness and the first set point corresponds to a target force corresponding to a target weight of first powder.

12. The method of claim 8 wherein the second value of compression information corresponds to a resultant force measured while compressing the second powder to an established thickness and the second set point corresponds to a target force corresponding to a target weight of second powder.

13. The method of claim 8 wherein the first powder is compressed with a compression mechanism, the first value of compression information corresponds to a displacement of the compression mechanism measured while compressing the first powder at an established force, and the first set point corresponds to a target displacement of the compression mechanism corresponding to a target weight of first powder.

14. The method of claim 8 wherein the second powder is compressed with a compression mechanism, the second value of compression information corresponds to a displacement of the compression mechanism measured while compressing the second powder at an established force, and the second set point corresponds to a target displacement of the compression mechanism corresponding to a target weight of second powder.

* * * * *